(12) United States Patent
Wang et al.

(10) Patent No.: US 12,400,132 B2
(45) Date of Patent: Aug. 26, 2025

(54) SYSTEMS AND METHODS FOR WEIGHT OF EVIDENCE BASED FEATURE ENGINEERING AND MACHINE LEARNING

(71) Applicant: Walmart Apollo, LLC, Bentonville, AR (US)

(72) Inventors: Tzu-Yen Wang, San Mateo, CA (US); Jingru Zhou, San Jose, CA (US); Hui-Min Chen, Pleasanton, CA (US); James ZhiPing Tang, Cupertino, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 921 days.

(21) Appl. No.: 17/644,818

(22) Filed: Dec. 17, 2021

(65) Prior Publication Data

US 2023/0196133 A1    Jun. 22, 2023

(51) Int. Cl.
    *G06N 5/022*      (2023.01)

(52) U.S. Cl.
    CPC ................... *G06N 5/022* (2013.01)

(58) Field of Classification Search
    CPC .......... G06N 5/022; G06N 20/10; G06N 5/01; G06N 7/01; G06N 20/00; G06N 20/20
    See application file for complete search history.

(56) References Cited

U.S. PATENT DOCUMENTS

2008/0287308 A1* 11/2008 Hubbell ............... G16B 40/30
    506/8
2015/0317560 A1* 11/2015 Aharoni ................ G06N 5/04
    706/11
2017/0185904 A1* 6/2017 Padmanabhan .......... G06N 5/04
(Continued)

FOREIGN PATENT DOCUMENTS

WO    WO-2019186198 A1 * 10/2019 ......... G06F 16/9024
WO    WO-2020257782 A1 * 12/2020 ............. G06N 20/10

OTHER PUBLICATIONS

O'brien, R.M. A Caution Regarding Rules of Thumb for Variance Inflation Factors. Qual Quant 41, 673-690 (2007). https://doi.org/10.1007/s11135-006-9018-6 (Year: 2007).*

(Continued)

*Primary Examiner* — Ajay M Bhatia
(74) *Attorney, Agent, or Firm* — Morgan, Lewis & Bockius LLP; Manita Rawat

(57) ABSTRACT

Systems and methods for generating and using trained logit models using weight-of-evidence (WOE) based processes are disclosed. A training data set including sets of variables and a classification of each set in the sets of variables is received. The classification includes one of at least two potential classifications. A WOE feature set is generated by applying a binning process to each variable in the set of variables to generate one or more WOE transformations and applying the one or more WOE transformations to a corresponding variable in the set of variables. A trained logistic regression model is generated by applying an iterative training process based on the WOE feature set. The trained logistic regression model is configured to classify each set of variables. Production data sets are classified into one of the at least two potential classifications using the WOE transformations and the trained logistic regression model.

20 Claims, 11 Drawing Sheets

(56) References Cited

U.S. PATENT DOCUMENTS

| | | | |
|---|---|---|---|
| 2018/0285886 A1* | 10/2018 | Yan | G06Q 30/018 |
| 2019/0180841 A1* | 6/2019 | Douglas | G06N 7/01 |
| 2019/0295000 A1 | 9/2019 | Candel et al. | |
| 2020/0250477 A1* | 8/2020 | Barthur | G06F 11/0751 |
| 2021/0065192 A1* | 3/2021 | Kang | G06Q 20/4016 |
| 2021/0232978 A1* | 7/2021 | Cai | G06N 5/01 |
| 2021/0264311 A1 | 8/2021 | Mukherjee | |
| 2021/0319366 A1* | 10/2021 | Liu | G06N 20/00 |
| 2021/0334589 A1* | 10/2021 | Plant | G06F 9/542 |
| 2022/0094709 A1* | 3/2022 | Sharma | G06F 18/2415 |
| 2022/0400135 A1* | 12/2022 | Gamra | H04L 63/20 |
| 2023/0171235 A1* | 6/2023 | Chhibber | H04L 63/1425 |
| | | | 726/4 |
| 2023/0196133 A1* | 6/2023 | Wang | G06N 7/01 |
| | | | 706/12 |
| 2025/0104111 A1* | 3/2025 | Wang | G06N 20/00 |

OTHER PUBLICATIONS

Solmaz-Kaiser "How to build a machine learning model withoutcoding knowledge", Jan. 5, 2020, 11 pages.

Pyscoring, pywoe 0.0.2, The missing scikit-learn addition to work with Weight-of-Evidence scoring. Sep. 22, 2020, 5 pages.

\* cited by examiner

SYSTEMS AND METHODS FOR WEIGHT OF EVIDENCE BASED FEATURE ENGINEERING AND MACHINE LEARNING

TECHNICAL FIELD

This application relates generally to automated model generation, more particularly, to automated machine learning logistic regression model generation.

BACKGROUND

Logistic regression models, commonly referred to as logit models, are machine learning classification methods that model a binary dependent variable. Logit models may be used to model the probability of a certain class or event existing (e.g., pass/fail, win/loss, etc.) and/or for identifying the probability of one of a set of classes or events occurring (e.g., whether an image includes a specific animal). Logit models may be extended to include more than two values using multinomial logistic regression and/or ordinal logistic regression (for use with ordered categories). In some instances, logit models have been deployed for use in fraud detection.

Current development and deployment of logit models requires detailed understanding of machine learning processes, including underlying mathematic and programming concepts. The specialized knowledge required for logit model deployment limits the scenarios for which logit models can be deployed. Current computer systems are thus limited in their ability to quickly and accurately deploy logit models as part of automated or partially automated processes.

SUMMARY

In various embodiments, a system is disclosed. The system includes a non-transitory memory having instructions stored thereon and a processor configured to read the instructions. The processor is configured to receive a training data set including sets of variables and a classification of each set in the sets of variables. The classification includes one of at least two potential classifications. The processor is further configured to generate a weight-of-evidence (WOE) feature set by applying a binning process to each variable in the set of variables to generate one or more WOE transformations and applying the one or more WOE transformations to a corresponding variable in the set of variables. A trained logistic regression model is generated by applying an iterative training process based on the WOE feature set. The trained logistic regression model is configured to classify each set of variables. A production data set is classified into one of the at least two potential classifications using the WOE transformations and the trained logistic regression model.

In various embodiments, a non-transitory computer readable medium having instructions stored thereon is disclosed. The instructions, when executed by a processor cause a device to perform operations including receiving an input data set including a set of variables. The input data corresponds to a process. The operations further include generating a weight-of-evidence (WOE) feature set by applying at least one WOE transformation to at least one variable in the input data set, classifying the input data set into one of at least two potential classifications using a trained logistic regression model based on the WOE feature set, and executing additional steps of the process only when the input data set is classified in a predetermined classification. The trained logistic regression model is trained by a training data set including sets of WOE variables and a classification of each set of WOE variables. The classification includes one of the at least two potential classifications.

In various embodiments, a computer-implemented method is disclosed. The computer-implemented method includes the steps of receiving an input data set including a set of variables corresponding to a process, generating a weight-of-evidence (WOE) feature set by applying at least one WOE transformation to at least one variable in the input data set, classifying the input data set into one of at least two potential classifications using a trained logistic regression model based on the WOE feature set, and executing additional steps of the process only when the input data set is classified in a predetermined classification. The trained logistic regression model is trained by receiving a training data set including sets of training variables and a classification of each set in the sets of training variables, generating a WOE training set, and applying an iterative training process based on the WOE training set. The classification includes one of the at least two potential classifications. The WOE training set is generated by applying a binning process to each variable in the set of training variables to generate one or more WOE transformations and applying the one or more WOE transformations to a corresponding variable in the set of training variables.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
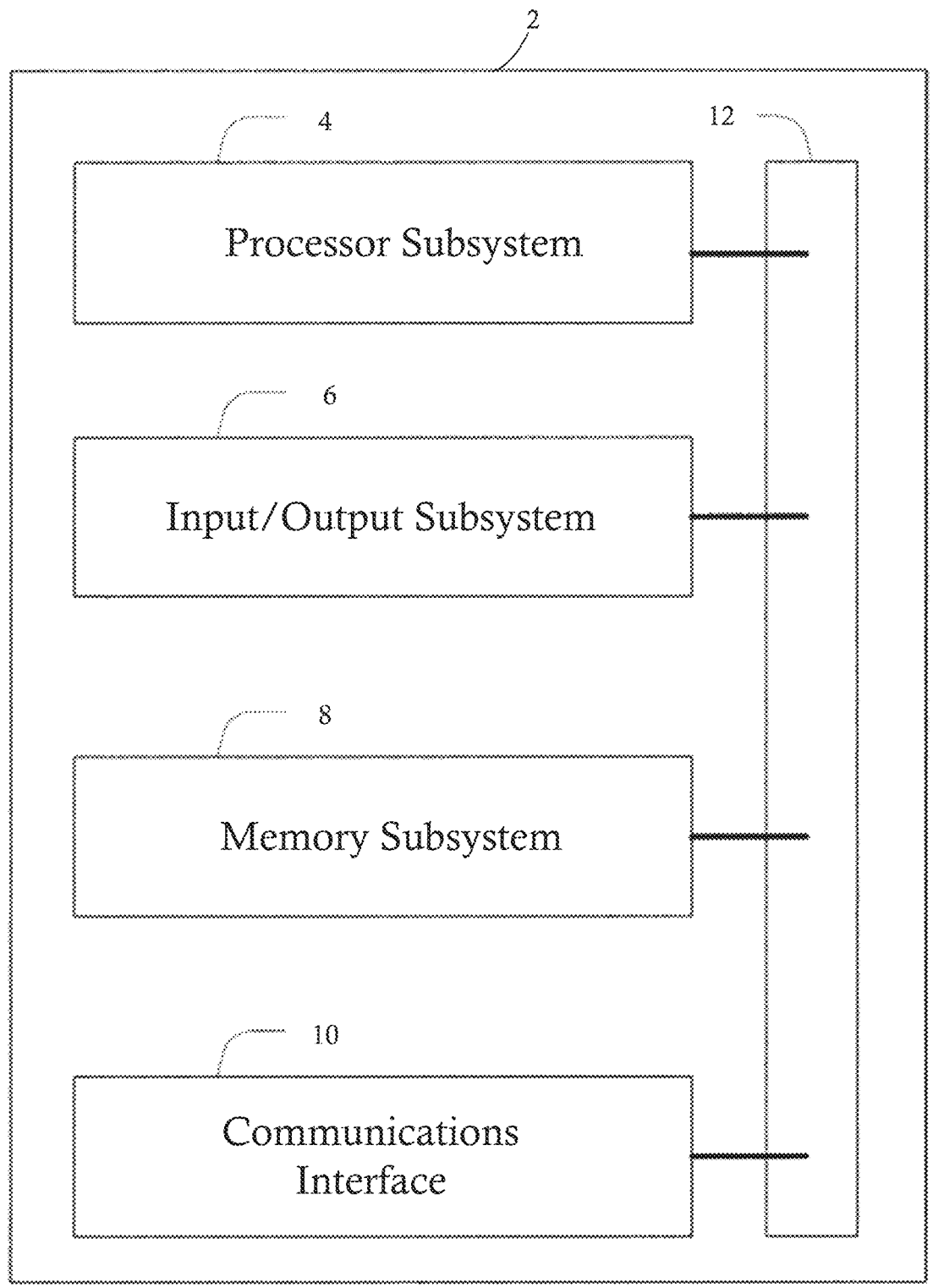
FIG. 1 illustrates a block diagram of a computer system, in accordance with some embodiments.

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. Terms concerning data connections, coupling and the like, such as "connected" and "interconnected," and/or "in signal communication with" refer to a relationship wherein systems or elements are electrically and/or wirelessly connected to one another either directly or indirectly through intervening systems, unless expressly described otherwise. The term "operatively coupled" is such a coupling or connection that allows the pertinent structures to operate as intended by virtue of that relationship.

In various embodiments, systems and methods of generating logit models using an automated weight-of-evidence-based process are disclosed. The automated weight-of-evidence-based process provides streamlined, modeling-related tasks that may include, but are not limited to, data munging, feature transformation, feature selection, model building, and/or model evaluation. The automated weight-of-evidence-based process is configured to allow automatic development and deployment of logit models without the need for a skilled user to provide programming and/or machine learning instructions. The automated weight-of-evidence-based process may be configured to execute multiple processes simultaneously to allow execution of multiple, simultaneous experiments configured to fine tune one or more model parameters for deployment of the logit model.

In some embodiments, systems and methods of generating logit models are configured to receive an input data set, such as a training data set, including one or more variables, or features, for potential use in training one or more logit models. In some embodiments, the input data set includes classifications for one or more interactions, such as a transaction, represented by the data set. For example, in some embodiments, the systems and methods of generating logit models are configured to generate one or more logit models for fraud detection. The input data set may include a plurality of transactions each having one or more variables and an indication of whether the transaction is fraudulent or legitimate. It will be appreciated that other classifications, such as approved/unapproved, may be used for fraud detection. It will also be appreciated that logit models may be generated to perform any suitable type of classification based on the input data set and the requirements for the logit model.

In some embodiments, the input data set is used to generate one or more logit models. Each variable in the input data set may be converted into a weight-of-evidence (WOE) variable by applying one or more weight-of-evidence transformations. The WOE transformations may be selected based on a variable type. For example, in some embodiments, a numerical variable may be transformed into a WOE variable using an isotonic and/or binning transformation while a categorical variable may be transformed using only a binning transformation. It will be appreciated that any suitable WOE transformation may be applied.

In some embodiments, after the transformation, a set of WOE variables may be selected for generating one or more logit models. The WOE variables may be selected using any suitable process. In some embodiments, the WOE variables are ranked, for example based on an information value, and the WOE variables having the highest information value within a predetermined range are selected. In some embodiments, multicollinear variables are removed from the WOE variable set. A final set of WOE variables, or features, is selected for generation of one or more logit models.

In some embodiments, the logit model(s) are generated by applying a machine learning process to iteratively train one or more untrained models. As part of the iterative training process, a training data set including the selected WOE features and a corresponding classification for each set of WOE features is provided to a training system. The training data set may be split into a training set and a testing or verification set. After training, the logit model is verified using one or more testing or verification sets, such as the set selected from the training data set and/or a separate verification set. After verification, the logit model is output for use in one or more process flows, for example, to perform fraud detection in real-time during one or more transactions.

As used herein, the term "automated" refers to processes which are both fully automated (e.g., not requiring any additional input beyond an initial set of conditions) and/or partially automated (e.g., requiring input at various stages of the process). Partially automated processes may be configured to receive input from one or more other automated processes, from a storage system, and/or from a user.

In some embodiments, the WOE-based systems and methods are configured to provide an end-to-end machine learning workflow that automatically develops and deploys machine learning models, such as logit models, based on minimum input. The WOE-based processes may be configured to operate autonomously such that all parameters, inputs, etc. required during the process are generated or retrieved automatically without user input. In some embodiments, the WOE-based processes provide an optimized machine learning model by executing multiple experiments to identify optimal model parameters.

In some embodiments, the WOE-based processes include an isotonic regression to transform numerical variables into monotonically increasing and/or decreasing WOE variables. In some embodiments, a binning transformation, such as a tree-binning transformation, may be applied to transform variables, such as numerical or categorical variables, into WOE variables. It will be appreciated that any suitable transformations may be applied to transform original variables into WOE variables, in accordance with the disclosed embodiments.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including WOE-based logit model generation, as described herein. The instruction set may be stored in any acceptable form of machine readable instructions, including source code or various appropriate programming languages. Some examples of programming languages that may be used to store the instruction set comprise, but are not limited to: Java, C, C++, C #, Python, Objective-C, Visual Basic, or .NET programming. In some embodiments a compiler or interpreter is comprised to convert the instruction set into machine executable code for execution by the processing subsystem 4.

Figure 2:
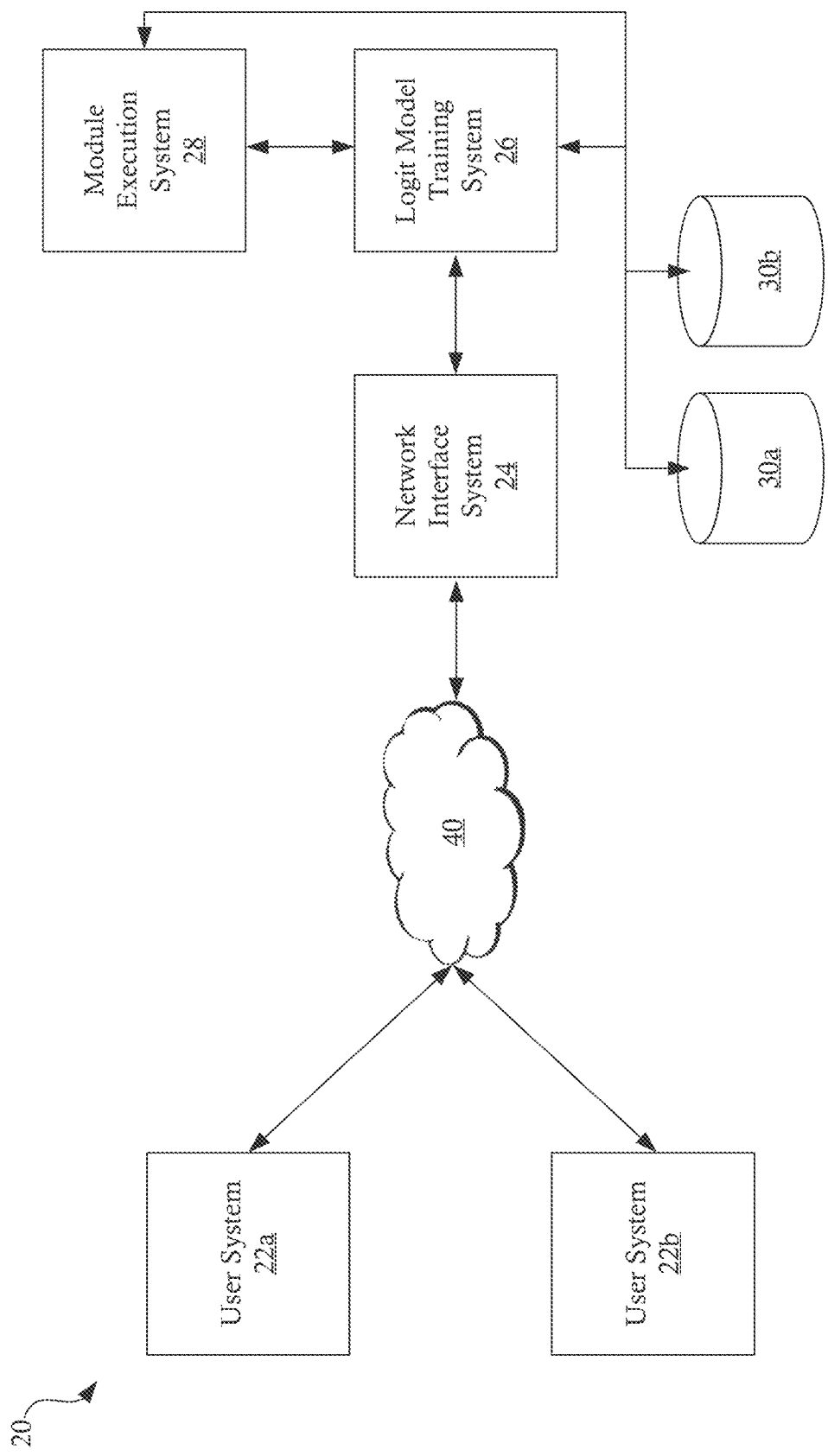
FIG. 2 illustrates a network environment configured to provide weight-of-evidence-based logit model development and deployment, in accordance with some embodiments.

FIG. 2 illustrates a network environment 20 environment configured to provide weight-of-evidence-based logit model development and deployment, in accordance with some embodiments. The network environment 20 may include, but is not limited to, one or more user systems 22a, 22b, a network interface system 24, a logit model training system 26, a module execution system 28, one or more item databases 30a, 30b, and/or any other suitable system. Each of the systems 22a-28 and/or the databases 30a-30b may include a system as described above with respect to FIG. 1. Although embodiments are illustrated herein having discrete systems, it will be appreciated that one or more of the illustrated systems may be combined into a single system configured to implement the functionality and/or services of each of the combined systems. For example, although embodiments are illustrated and discussed herein including each of a network interface system 24, a logit model training system 26, and a module execution system 28, it will be appreciated that these systems may be combined into a single logical and/or physical system configured to perform the functions and/or provide services associated with each of the individual systems. It will also be appreciated that each of the illustrated systems may be replicated and/or split into multiple systems configured to perform similar functions and/or parts of a function.

In some embodiments, the network interface system 24 is configured to provide a network interface to the one or more user systems 22a, 22b. The network interface may include any suitable type of network interface, such as, for example, a development interface, a search interface, an inventory interface, etc. Although embodiments are discussed herein with reference to an a development interface, it will be appreciated that the disclosed systems and methods are applicable to any interface configured to allow process generation including deployment of one or more logit models and/or applicable to any suitable user interface, such as an e-commerce interface. In addition, although embodiments are discussed herein including a network interface, it will be appreciated that the systems and methods of generating logit models using an WOE-based process may be configured and deployed on a single system, such as, for example, a single system as described in FIG. 1.

In some embodiments, the network interface 24 is configured to receive a request to generate a logit model from a user system 22a, 22b. The request may include, for example, a reference to an existing and/or partially completed process flow, one or more input data sets, and/or any other information suitable for defining a target logit model. The target input may include any suitable format, such as, for example, an alphanumeric input from a command console, a reference to an existing process flow, etc. In some embodiments, the input data set may be obtained from a storage location, such as, for example, a local storage device, a network storage device, and/or any other suitable storage device.

In some embodiments, the network interface system 24 is in signal (e.g., data) communication with a logit model training system 26. The logit model training system 26 is configured to automatically generate a logit model suitable for deployment within a process or environment based on the input data set received from the user system. The logit model training system 26 utilizes a WOE-based process to generate one or more logit models for deployment. As discussed in greater detail below, in some embodiments, the WOE-based process includes one or more data preparation processes, feature selection processes, and/or multi-collinearity detection processes. The data preparation process may include one or more WOE transformations and each of the feature selection processes and/or multi-collinearity detection processes may be based on generated WOE values. In some embodiments, the WOE-based process generates one or more WOE transformations and/or one or more logit models. Generation of a logit model may include various model evaluation processes, model classification processes, and/or any other suitable processes for generating a logit model using iterative machine learning training of an untrained model.

In some embodiments, the logit model training system 26 is in signal (e.g., data) communication with at least one module execution system 28 configured to implement one or more modules or sub-processes of WOE-based process implemented by the logit model training system 26. The logit model training system 26 may provide any suitable input and/or commands to the module execution system 28 to implement a selected module and/or sub-process. Although FIG. 2 illustrates embodiments with a separate module execution system 28, it will be appreciated that the modules and sub-processes of the WOE-based process may each be executed by the logit model training system 26.

Figure 3:
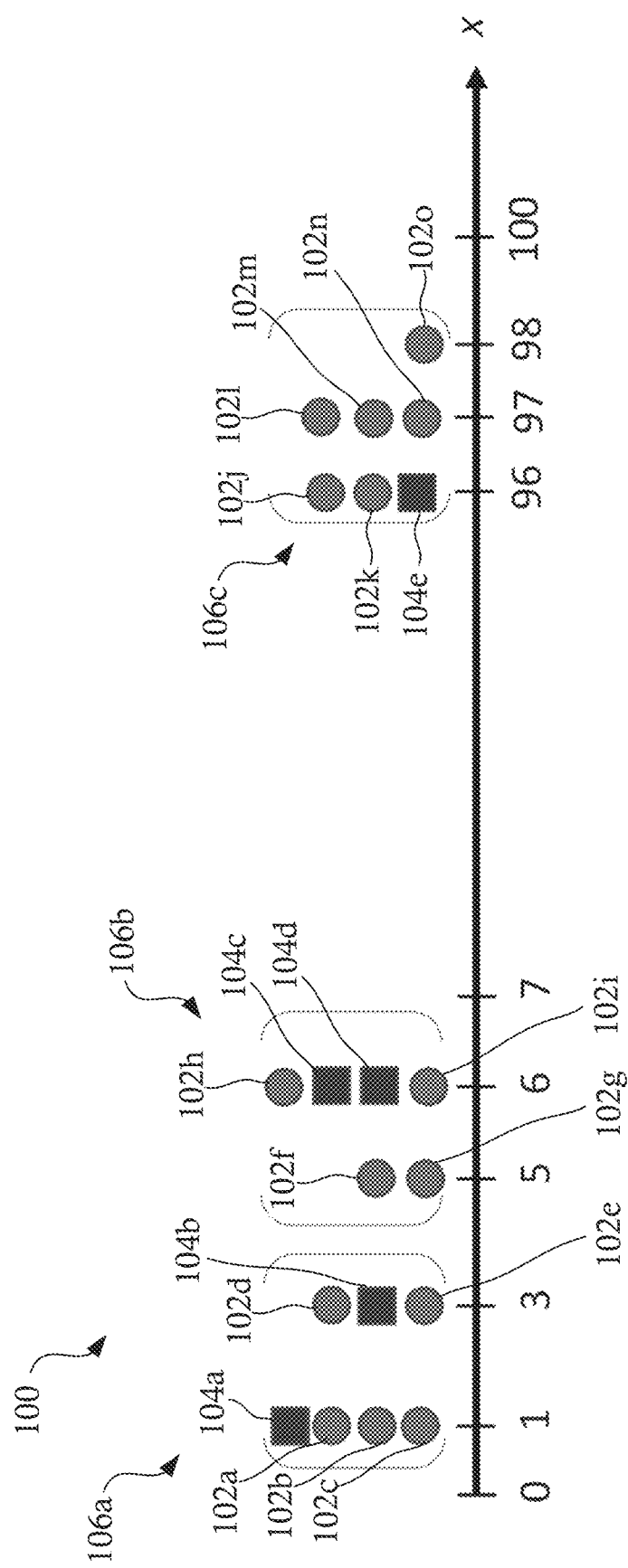
FIG. 3 illustrates a WOE transformation, in accordance with some embodiments.

In some embodiments, one or more WOE transformations are determined and implemented prior to training of a logit model. FIG. 3 illustrates a WOE transformation 100 for a variable, in accordance with some embodiments. As shown in FIG. 3, a WOE transformation allows grouping and/or conversion of a variable having a first specific value 102a-102o or a second specific value 104a-104e into bins 106a-106c. In some embodiments, the weight-of-evidence transformation is accomplished such that, given a variable x, the weight-of-evidence value of the variable's bin can be calculated as:

$$WOE_i = \log \frac{\frac{N^i_{104_i}}{N_{104_i}}}{\frac{N^i_{102_i}}{N_{102_i}}} = \log \frac{P^i_{104_i}}{P^i_{102_i}} \quad \text{(Equation 1)}$$

where i is a bin index, $N_{102_i}^i$ is the number of occurrences of a first value 102 of the variable within bin i, $N_{102_i}$ is the total number of occurrences of the first value 102 of the variable, $N_{104_i}^i$ is the number of occurrences of a second value 104 of the variable within bin i, $N_{104_i}$ is the total number of occurrences of the second value 104 of the variable, $P_{102_i}^i$ is the probability of the first value 102 of the variable occurring in bin i and $P_{104_i}^i$ is the probability of the second value 104 of the variable occurring in bin i. The WOE transformation provides handling of missing values in a data set, easily account for outliers in a data set, and avoids the use of dummy variables. In some embodiments, the WOE transformation 100 is based on a logarithmic value of distributions which is aligned with a logistic regression. In the embodiment illustrated in FIG. 3, the variables are grouped into three weight-of-evidence bins 106a-106c, corresponding to specific values $$\left( \text{e.g., } \log \frac{2/5}{5/15}, \log \frac{2/5}{4/15}, \log \frac{1/5}{6/15} \right).$$

Although specific embodiments are discussed herein, it will be appreciated that the WOE transformed variables and corresponding bin values are dependent on the distribution of values for a selected variable.

In some embodiments, a WOE transformation is configured to transform an independent variable into a set of bins (e.g., segments, groups, clusters, etc.) based on the similarity of the variable distribution. In some embodiments, a WOE-based process for generating a logit model may include the generation of two or more bins among the variable values of a continuous independent variable. A weight-of-evidence value may be calculated for each bin and bins having a similar WOE value are combined. The bins are replaced with WOE values (e.g., defined as WOE variables). The WOE values/variables are provided as input values to train one or more logit models. Transformation of a categorical independent variable is similar to the transformation of a continuous variable previously discussed with the initial step of creating bins among the variable values omitted. The weight-of-evidence transformation converts the categorical variable(s) into a condensed representation using continuous values.

Figure 4:
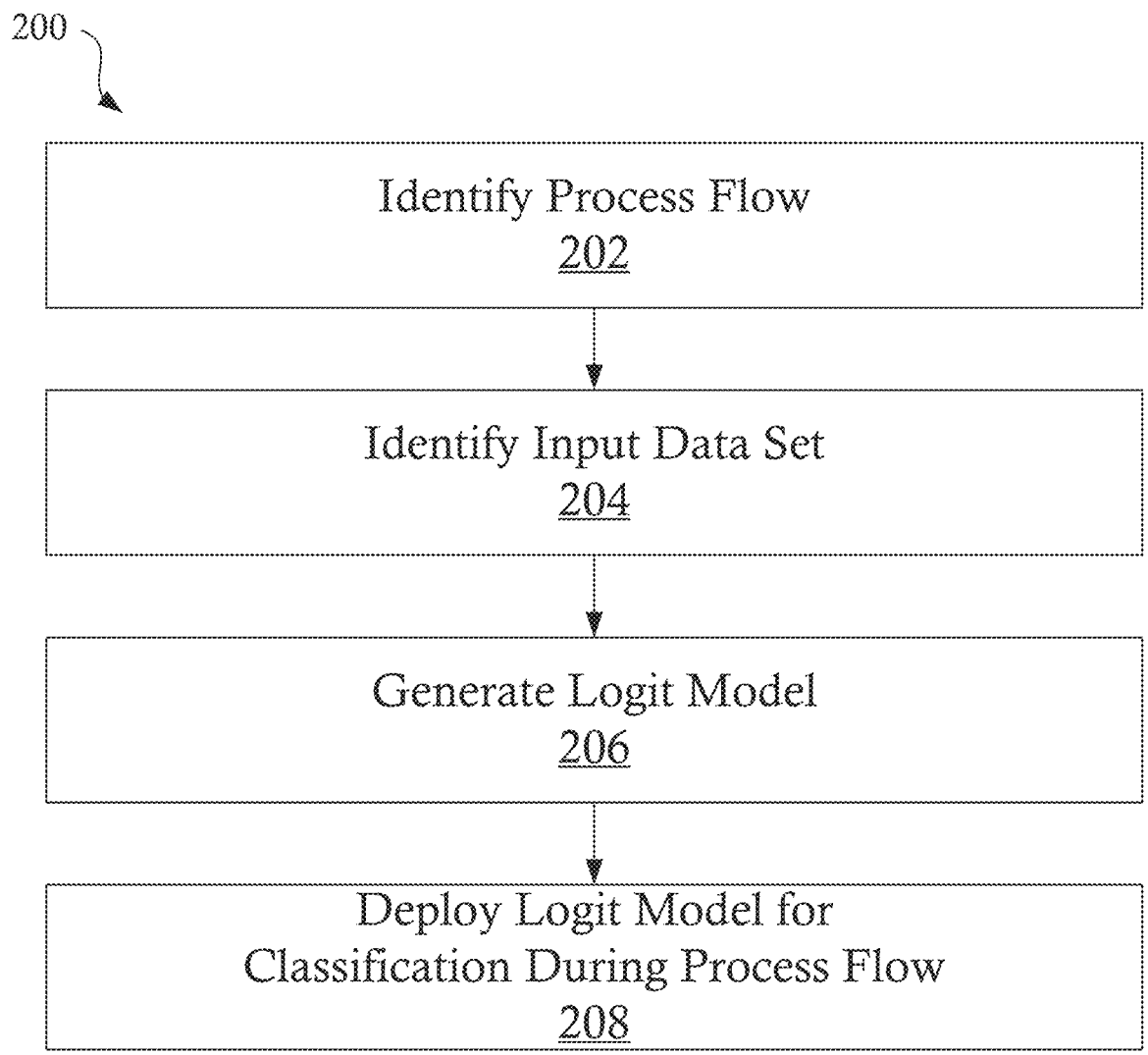
FIG. 4 is a flowchart illustrating a method of generating and deploying a logit model using a WOE-based process, in accordance with some embodiments.

FIG. 4 is a flowchart illustrating a method 200 of generating and deploying a logit model using a WOE-based process, in accordance with some embodiments. At step 202, a process flow is identified for deployment of a logit model. The process flow may include any suitable process flow that may benefit from classification of a set of variables by a logit model. In some embodiments, the process flow includes an e-commerce process flow that may potentially be exploited through fraudulent interactions. For example, an e-commerce process flow may include, but is not limited to, a purchase transaction, a return transaction, a service request, etc. One or more logit models may be deployed for fraud detection during transactions, interactions, and other potentially fraudulent scenarios within an e-commerce workflow. Although embodiments are discussed herein including an e-commerce work flow, it will be appreciated that the disclosed WOE-based processes may be used to deploy logit models to any suitable process flow or workflow.

At step 204, an input data set is identified for use in training one or more logit models. The input data set may be identified by a user, such as, for example, a user generating and/or modifying the process flow identified at step 202, and/or may be automatically identified by a WOE-based process based on the process flow identified at step 202. The input data set includes one or more variables that may be selected for use in a logit model classification process and a classification of one or more transactions for training of the logit model.

At step 206, the input data set is provided to a WOE-based process for generating a logit model. As discussed in greater detail below, the WOE-based process is configured to receive the input data set, transform each variable within the input data set into a WOE variable, optionally select a set of WOE variables for logit model generation, and train a logit model based on the selected WOE variables. In some embodiments, the output of the WOE-based process for generating a logit model includes one or more trained logit models for deployment and one or more WOE transformations for transforming process data received during a workflow into WOE variables for input to the logit model.

Figure 5:
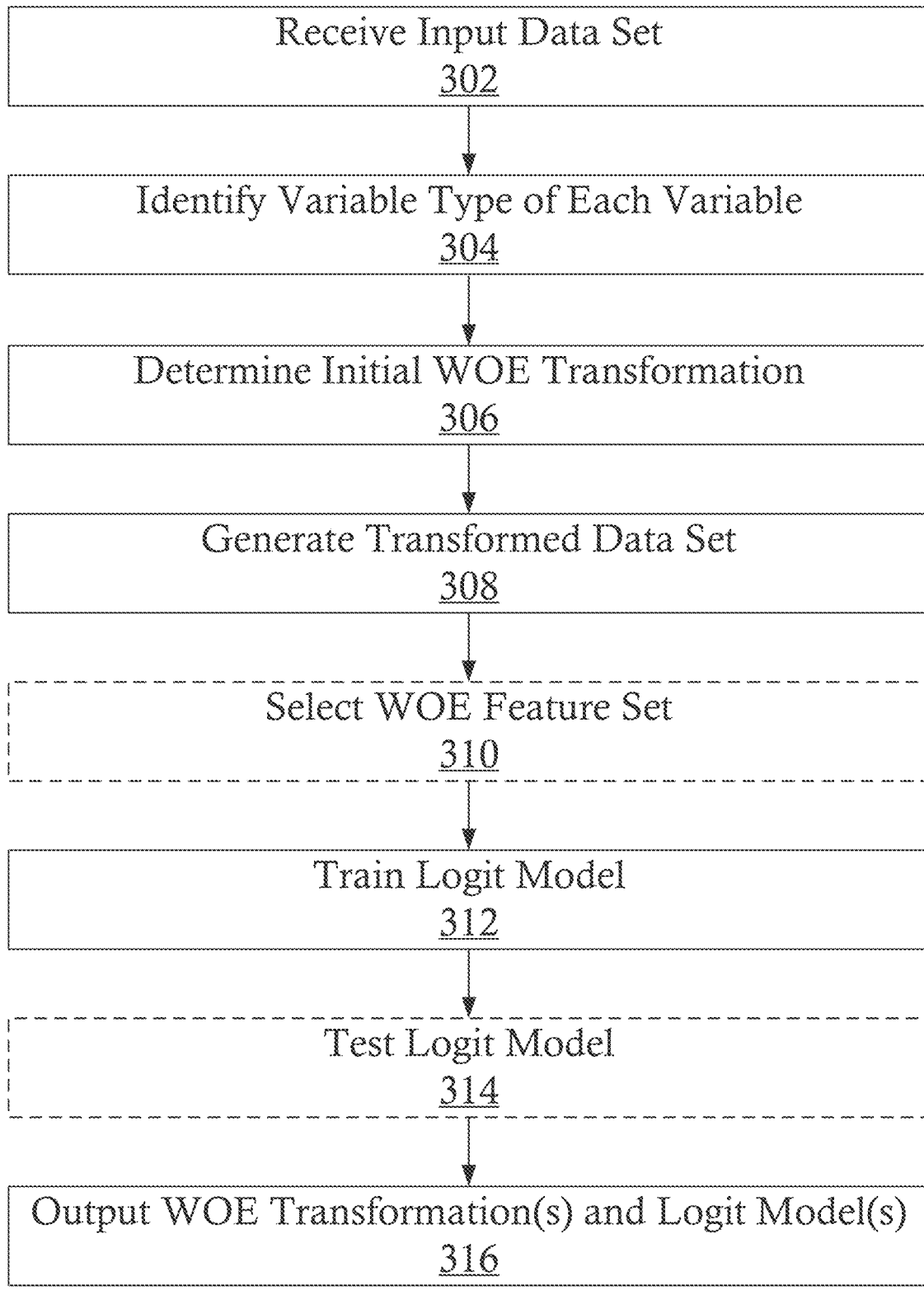
FIG. 5 is a flowchart illustrating a method of generating a logit model using a WOE-based process, in accordance with some embodiments.
Figure 6:
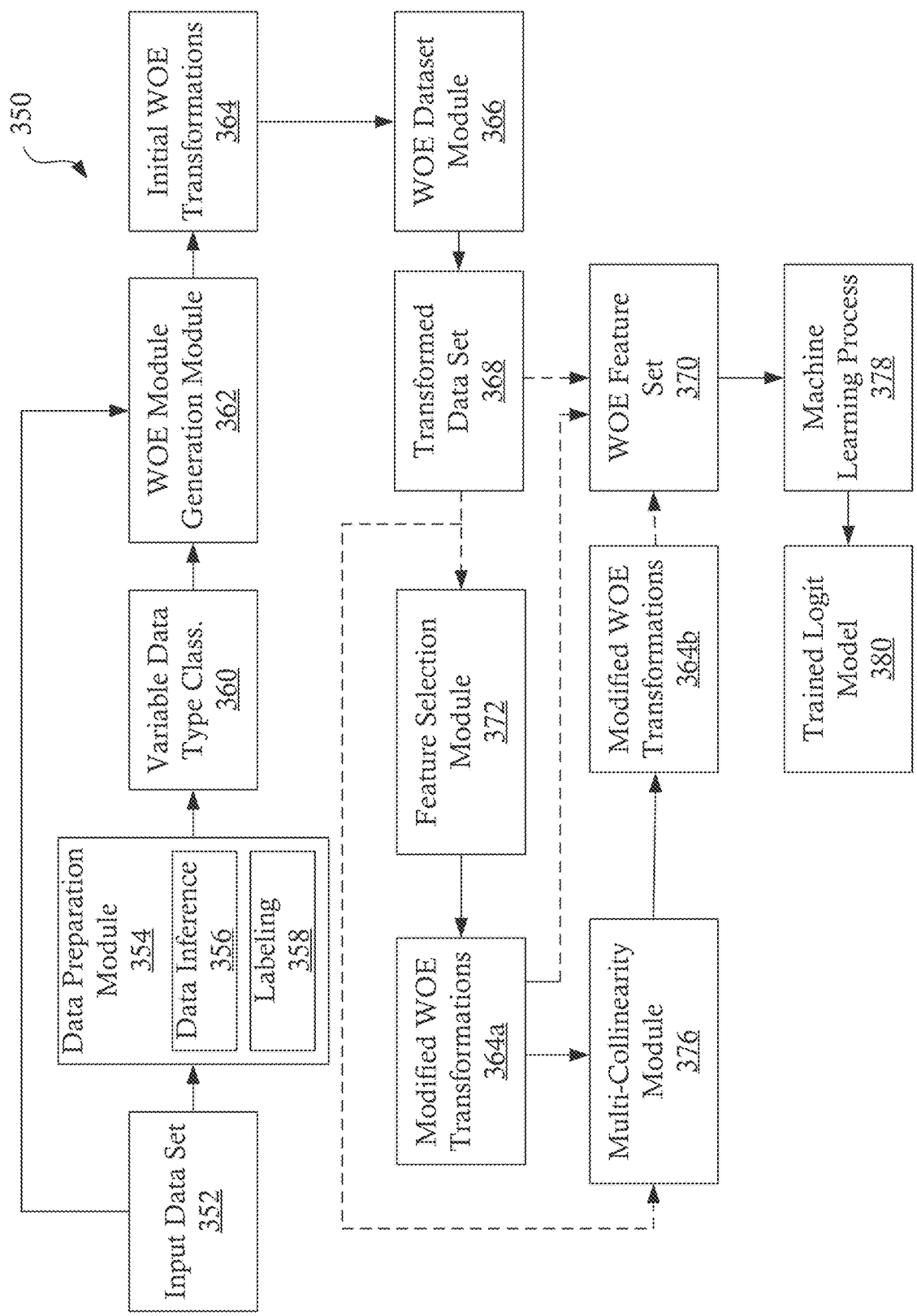
FIG. 6 is a process flow illustrating various steps of the method of generating a logit model of FIG. 5, in accordance with some embodiments.

FIG. 5 is a flowchart illustrating a WOE-based method 300 of generating a logit model, in accordance with some embodiments. FIG. 6 is a process flow 350 illustrating various elements of the WOE-based method 300 illustrated in FIG. 5, in accordance with some embodiments. The WOE-based method 300 is configured to generate one or more logit models for deployment in one or more processes or workflows, as discussed above.

At step 302, an input data set 352 is received by a system, such as the logit model training system 26. The input data set 352 includes one or more variables that may be used for generation of a logit model. The input data set 352 may be defined by a user, for example, by identifying individual variables and/or a process flow including the one or more variables, and/or may be automatically selected by the logit model training system 26 based on identification of a process or workflow and/or any other suitable input. The input data set 352 may include different types of variables, such as, for example, numerical variables and/or categorical variables. In some embodiments, the input data set 352, or portions thereof, may be retrieved from a storage medium, such as, for example, a database.

At step 304, the data type of each variable in the input data set 352 is determined and/or defined. The logit model training system 26 (and/or any other suitable system) may be configured to infer a data type for a variable based on, for example, a format of the variable, operations performed on the variable, identifiers included with the variable, and/or any other suitable information. In some embodiments, the variable type of an input variable may be identified as part of the input data set 352.

In some embodiments, the input data set 352 is provided to a data preparation module 354 configured to perform variable data type inference 356 and labeling 358. The data preparation module 354 generates a variable data type classification 360 for each variable which identifies the variable type (e.g., numerical, categorical) of the variable. The variable data type classifications 360 may be output in any suitable format, such as, for example, a config.json file. Although specific embodiments are discussed herein, it will be appreciated that any suitable output file type may be used. In some embodiments, a modified input data set is generated that includes labels for each of the variables in the input data set 352.

At step 306, an initial WOE transformation is determined for each variable in the input data set 352. In some embodiments, the process used for determining an initial WOE transformation depends on the classification of the variable, for example, as determined at step 304. In various embodiments, a WOE transformation may be determined using isotonic regression and/or a binning tree process. In some embodiments, a numerical variable (i.e., a variable having numerical values) may be classified by either an isotonic regression or a binning tree process while a categorical variable may be classified using only a binning tree process. Although specific embodiments and processes are discussed herein, it will be appreciated that any suitable WOE determination may be used based on the variable data type classification 360.

In some embodiments, a WOE model generation module 362 is configured to generate a set of initial WOE transformations 364 including a WOE transformation for each variable in the input data set 352. Each generated WOE transformation in the set of WOE transformations 364 is configured to transform a raw variable (e.g., a variable provided in raw format) into a WOE variable. IN some embodiments, the WOE model generation module 362 is configured to generate a WOE detail file including a WOE transformation (e.g., binning results) for each variable in the input data set 352.

Figure 7:
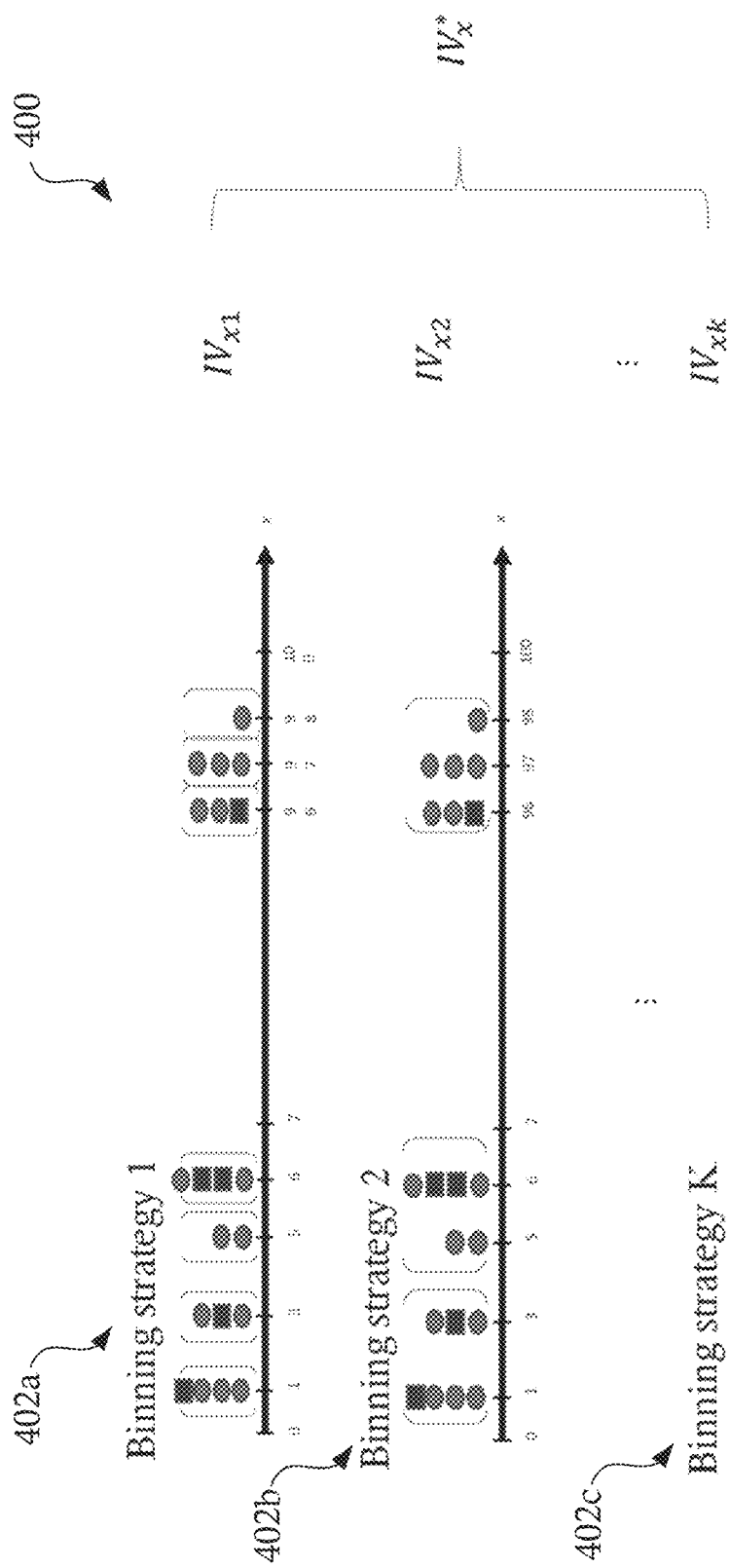
FIG. 7 illustrates a sequential binning process, in accordance with some embodiments.

In some embodiments, the WOE model generation module 362 implements a binning tree process to generate a WOE transformation. AS previously discussed, in some embodiments, a binning tree process may be applied to a numerical variable or a categorical variable. A binning tree process, also referred to as an information value process, is a discrete binning process that is used to reduce the effects of observation efforts. As shown in FIG. 7, multiple binning strategies 402a-402c may be applied to identify the binning strategy having the highest information value. In some embodiments, binning is determined according to the equation:

$$IV_x = \Sigma_{i=1}^m (P_{202}^i - P_{204}^i) * WOE_i \quad \text{(Equation 2)}$$

where IV is the information value of the variable x.
Applying multiple binning processes as shown in FIG. 7 may be computationally and time intensive.

Figure 8:
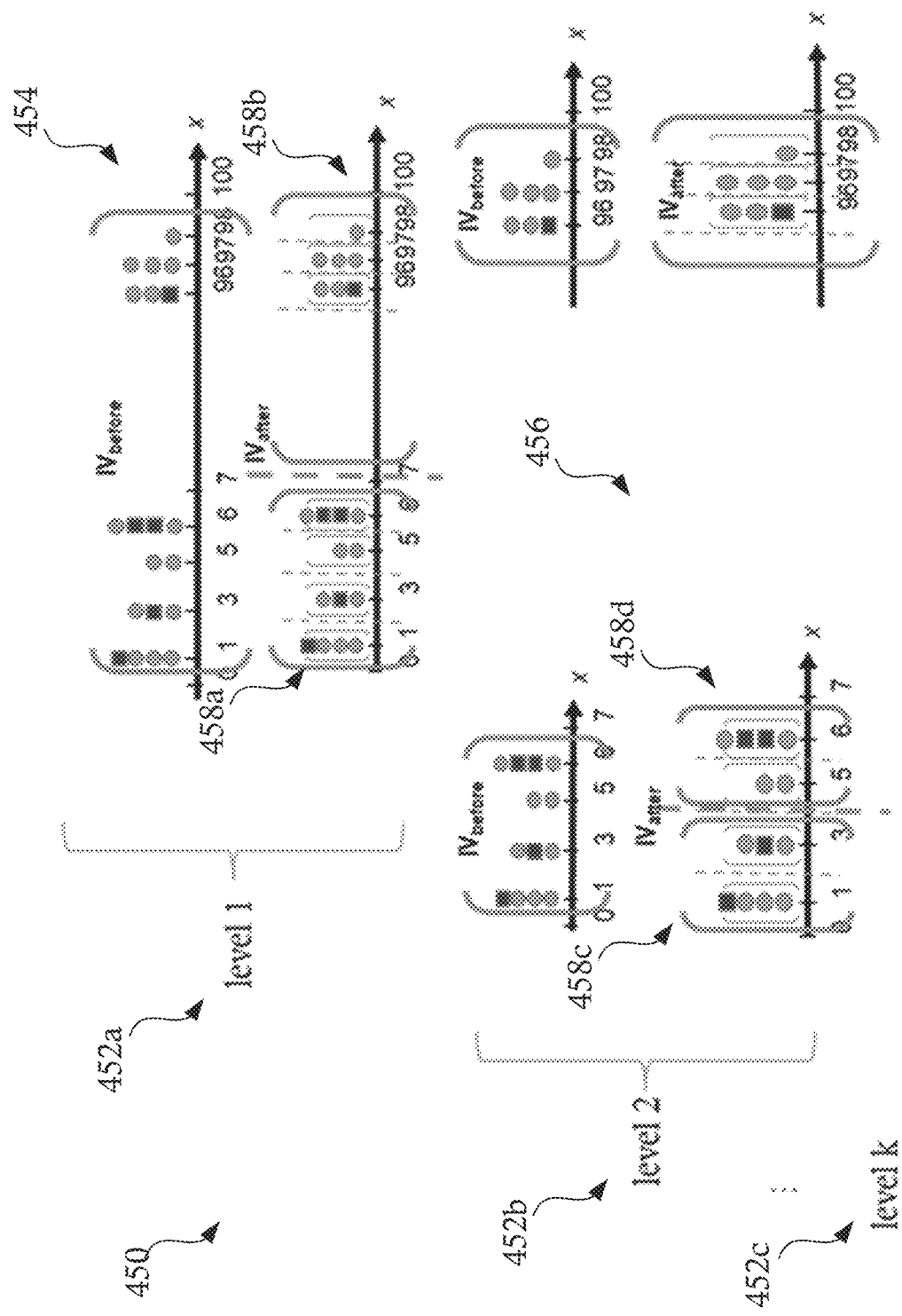
FIG. 8 illustrates a multi-level binning tree process, in accordance with some embodiments.

In some embodiments, a binning tree process may be used. As shown in FIG. 8, a binning tree process 450 may include multiple levels of binning 452a-452b and/or evaluation. For example, a first level of binning 452a may convert a set of variables 454 into a first set of bins 452 including a first bin 454a and a second bin 454b. After performing the first level of binning 452a, the first bin 454a may be further separated into a second set of bins 416 including a third bin 454c and a fourth bin 454d. Each bin is sequentially separated until separation of the bin does not result in an increase in IV value. If the IV value cannot be increased through further binning separation, the binning process is considered complete. For example, as shown in FIG. 8, the first bin 454a can be split at the second binning level to increase IV value, but the second bin 454b cannot as the second bin 454b already has a maximum IV value.

In some embodiments, binning is performed using a $WOE_i$ value calculated according to Equation 1, previously discussed. In some embodiments, the information value (IV) after binning is selected such that:

$$IV_{after} > (1+\alpha) * IV_{before} \quad \text{(Equation 3)}$$

where α is an incremental value determined by the weight-of-evidence model generation module 362. In some embodiments, α=0.01, although it will be appreciated that any suitable value may be assigned.

With reference again to FIGS. 5 and 6, in some embodiments, the WOE model generation module 362 implements an isotonic regression binning strategy to generate a WOE transformation. As previously discussed, in some embodiments, an isotonic regression binning process may be applied to a numerical variable. The isotonic regression binning strategy applies a set of weights to a set of input values to minimize an output value. For example, for a set of variable input values $y_1, y_2, \ldots, y_n$ and a set of weights $w_1, w_2, \ldots, w_n$ the isotonic regression binning strategy generates a monotonic output $\hat{y}_1, \hat{y}_2, \ldots, \hat{y}_n$ which minimizes $\Sigma_i^n w_i(\hat{y}_1 - y_i)^2$. In some embodiments, the WOE model generation module 362 assumes that $\{\hat{y}_i\}$ is an optimal solution of a generally increasing $\{y_i\}$. In such embodiments, if $y_i \geq y_{i+1}$, then $\hat{y}_i \geq \hat{y}_{i+1}$.

In some embodiments, the WOE model generation module 362 uses a pool-adjacent-violators algorithm (PAVA) to perform isotonic regression. In some embodiments, the PAVA process be defined as:

```
Let ŷ₁ ← y₁, ŵ₁ ← w₁, j ← 1
B₀ ← 0, B₁ ← 1
For i = 2, 3, . . . , n:
  j ← j + 1, ŷⱼ ← yᵢ, ŵⱼ ← wᵢ
  While j > 1 and ŷⱼ₋₁ > ŷⱼ, do:
```

$$\hat{y}_{j-1} \leftarrow \frac{\hat{w}_j \hat{y}_j + \hat{w}_{j-1}\hat{y}_{j-1}}{\hat{w}_j + \hat{w}_{j-1}}$$

```
    ŵⱼ₋₁ ← ŵⱼ + ŵⱼ₋₁
    j ← j − 1
  Bⱼ ← i
  For k = 1, . . . , j:
    ŷ[B_{k-1}+1:B_k] = ŷ_k
```

Although specific embodiments are discussed herein, it will be appreciated that any suitable PAVA process may be applied to perform isotonic regression.

Figures 9A, 9B, 9C:
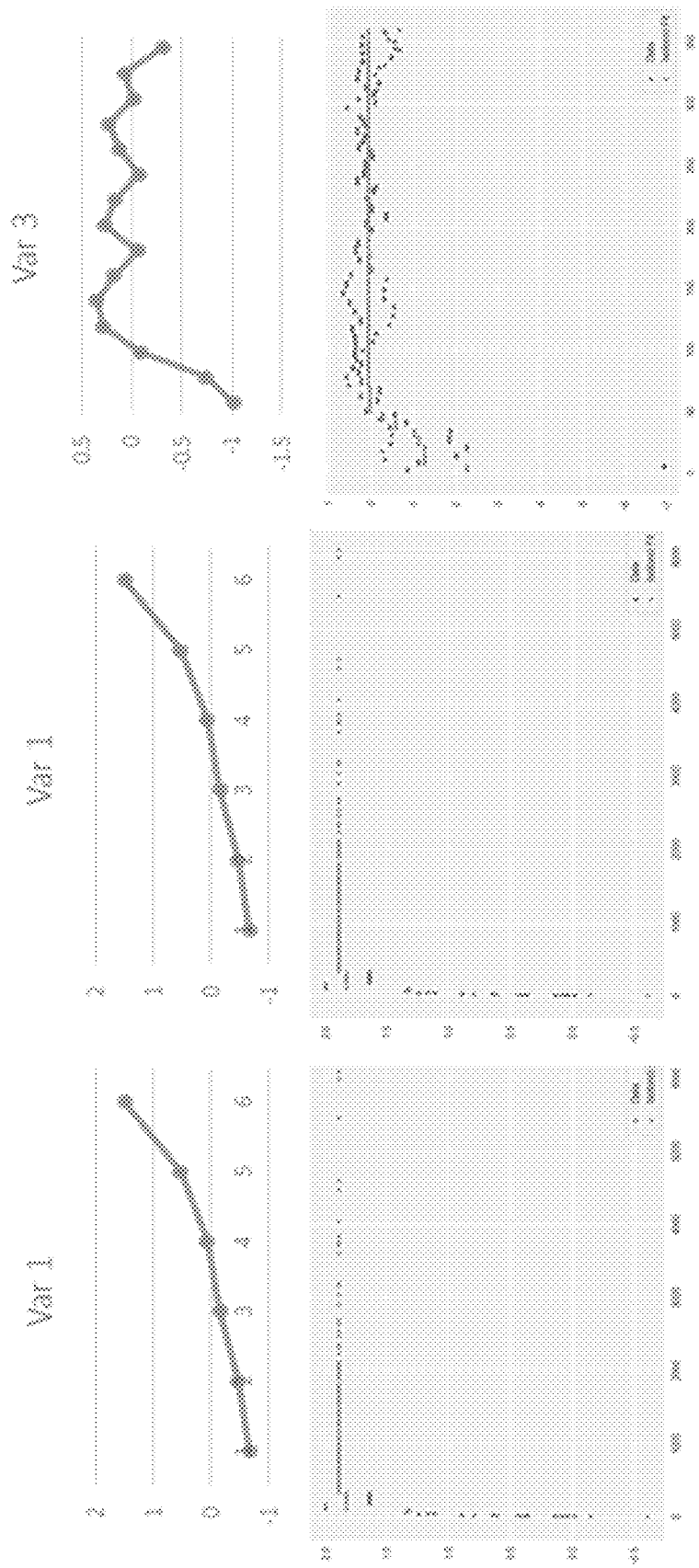
FIGS. 9A-9C illustrate three isotonic regression binning processes performed for three variables, in accordance with some embodiments.

FIGS. 9A-9C illustrate the results 502a-502c of three isotonic regression binning processes performed for three variables, in accordance with some embodiments. The first isotonic regression binning process was performed on a variable having values distributed as shown in chart 504a, the second isotonic regression binning process was performed on a variable having values distributed as shown in chart 504b, and the third isotonic regression binning process was performed on a variable having values distributed as shown in chart 504c. The first isotonic regression binning process resulted 502a in six bins 506a with an IV value of 0.60, the second isotonic regression binning process resulted 502b in 11 bins 506b with an IV value of 1.05, and the third isotonic regression binning process resulted 502c in 15 bins 506c with an IV value of 0.11. It will be appreciated that these values are provided solely as examples, and that the isotonic regression binning process implemented by the WOE model generation module 362 may result in any number of bins with any suitable IV value.

At step 308, a WOE dataset module 366 generates a transformed data set 368 by applying the WOE transformations 364 to the input data set 352. Although embodiments are illustrated including a weight-of-evidence dataset module 366, it will be appreciated that transformed data set 368 may be generated the WOE model generation module 362, for example, by directly applying the WOE transformations 364.

At optional step 310, a WOE feature set 370 may selected for use training of a logit model. In some embodiments, the WOE feature set 370 may be selected by applying one or more filtering processes to the transformed data set 368. The filtering processes may be configured to identify WOE variables within the transformed data set 368 providing the highest (e.g., best) predictive value for the logit model determination. For example, when training a logit model for fraud detection, the WOE feature set may be defined as a set of WOE variables having the highest information value and/or lowest redundancy in identifying fraudulent and/or non-fraudulent transactions. Although specific embodiments are discussed herein, it will be appreciated that any suitable filtering may be applied to identify a WOE feature set 370.

In some embodiments, selection of the WOE feature set 370 includes ranking of the WOE variables and selection of the top N variables. A feature selection module 372 may be configured to rank each WOE variable the transform data set 368 to identify the N variables having the highest IV value within a predetermined range. In some embodiments, an IV value above a predetermined threshold may indicate a variable that is considered to be "suspicious," i.e., that is too good to be true. The feature selection module 372 may be configured to discard any variable having an IV value above a predetermined threshold. For example, in some embodiments, any variable having an IV value above about 0.5 is discarded. Similarly, in some embodiments, an IV Value below a selected threshold may indicate variables that are not useful for prediction purposes in a logit model. The feature selection module 372 may be configured to discard any variable having an IV value below a predetermined threshold. For example, any variable having an IV value below about 0.2 may be discarded. Although specific embodiments are discussed herein, it will be appreciated that any suitable IV threshold value may be used to define an upper and/or lower threshold.

In some embodiments, the feature selection model 372 applies both an upper threshold value and a lower threshold value to define a range of IV values that qualify for use in logit model generation. Variables having a higher ranking (e.g., those variables closer to the upper threshold value) may be considered strong predictors of the class or event to be predicted by a logit model (e.g., fraudulent/non-fraudulent transaction). Variables having a lower ranking (e.g., those variables closer to the lower threshold value) may be considered weak predictors. In some embodiments, the feature selection model 372 is configured to select the N variables having the highest IV value within the predetermined range for generation of a logit model. The set of N variables selected is referred to herein as the set of features used for a logit model.

In some embodiments, the feature selection module 372 is configured to generate a modified set of WOE transformations 364a including WOE transformations corresponding only to WOE feature set (e.g., the set of N variables) in an input data set. In some embodiments, the WOE feature set 370 may be generated by applying the modified set of WOE transformations 364a to the input data set 352.

In some embodiments, selection of the WOE feature set 370 includes removal of multi-collinear variables. A multi-collinearity module 376 may be configured to apply a variance inflation factor (VIF) to identify features in the transformed dataset 368, 368a that are collinear (e.g., inter-dependent). VIF is the ratio of a variance of estimating a variable in the model that includes multiple other variables in the model. VIF is defined as the interrelatedness of two or more features, and may be defined as:

$$VIF = \frac{1}{1 - R^2}$$

where $R^2$ is a regression coefficient. Variables having a VIF above a predetermined threshold may be considered multi-collinear variables and one or more removed from the feature set. In some embodiments, the VIF threshold is equal to 10, although it will be appreciated that any suitable threshold may be used. In some embodiments, the multicollinearity module 376 is configured to generate a modified set of WOE transformations 364b configured to transform only the non-collinear raw variables in the input data set 352. In some embodiments, the WOE feature set may be generated by applying the modified set of WOE transformations 364b to the input data set 352.

At step 312, a logit model 380 is trained. The logit model 380 is generated by applying a machine learning training process 378 to an untrained model based on the WOE feature set 370. In some embodiments, a logistic regression model generation module 182 is configured to implement a logit model training process. The logistic regression model generation module 182 receives a WOE feature set 370 and generates a logit model configured to perform classification of one or more processes based on WOE variable values.

Figure 10:
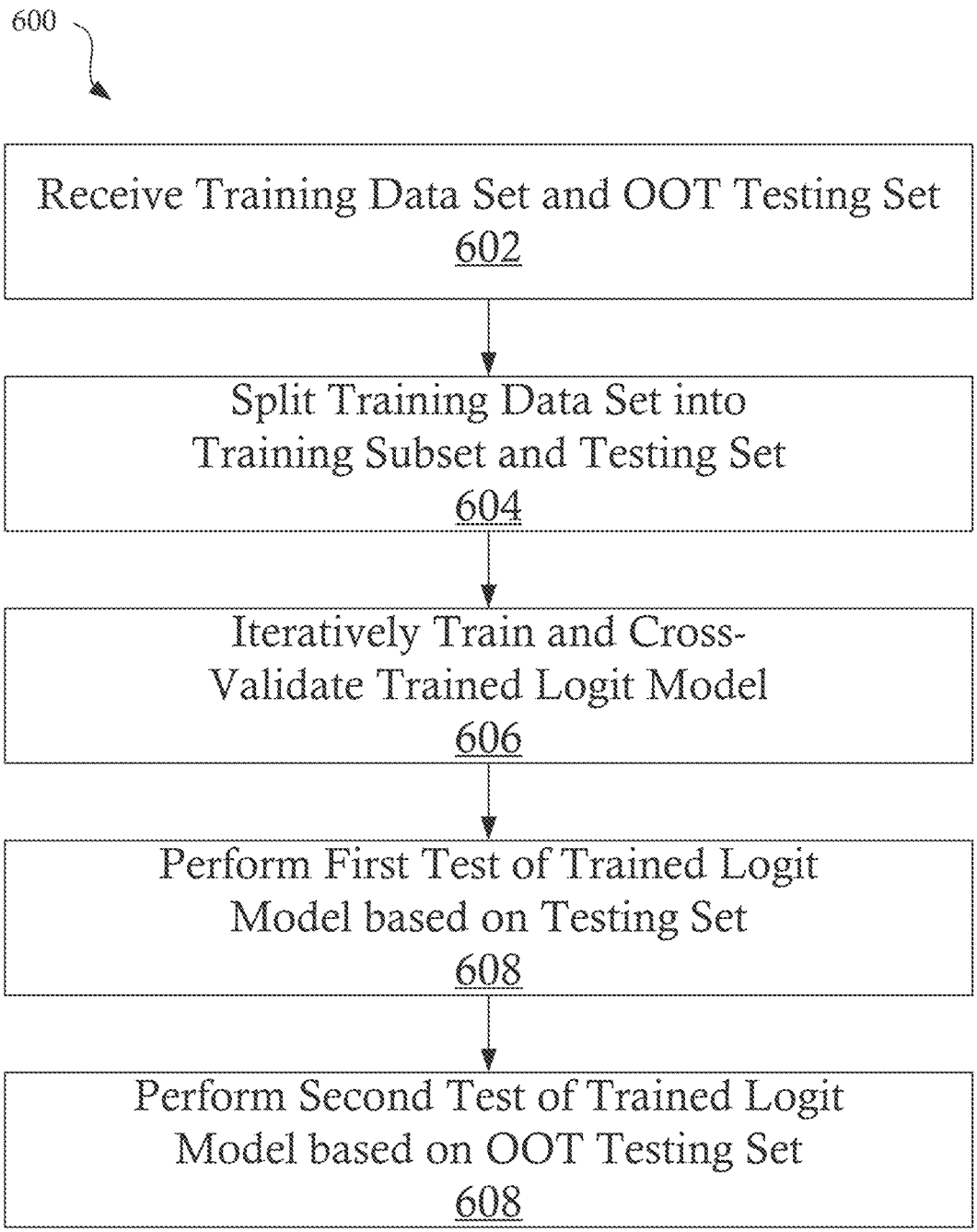
FIG. 10 is a flowchart illustrating a method of training a logit model, in accordance with some embodiments.
Figure 11:
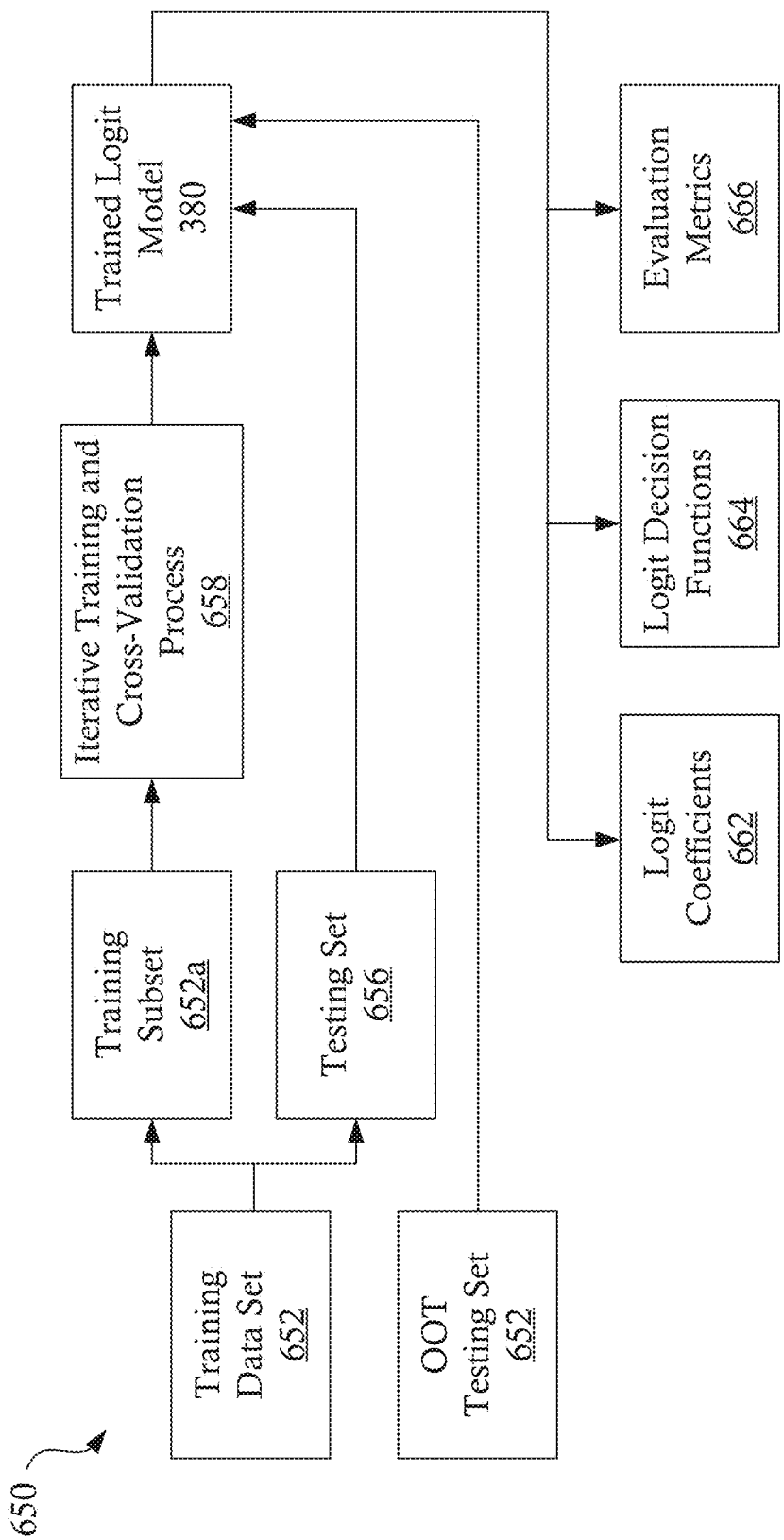
FIG. 11 is a process flow illustrating various steps of the method of training a logit model of FIG. 10, in accordance with some embodiments.

FIG. 10 illustrates a method 600 of training a logit model using WOE variables, in accordance with some embodiments. FIG. 11 is a process flow 650 illustrating various elements of the method 600 of FIG. 10, in accordance with some embodiments. The method 600 may be implemented by any suitable system, such as, for example, the logit model training system 26 and/or the module execution system 28.

At step 602, a training data set 652 and an out-of-time (OOT) testing set 654 are received. Each of the training data set 652 and the OOT testing set 654 include a WOE feature set that have been prepared according to the process defined for steps 304-310 of method 300, previously discussed. In some embodiments, the training data set 652 and/or the OOT testing set 654 are the WOE feature set 370 generated by the method 300, as previously discussed.

At step 604, a training data set 652 is split into a training subset 652a and a testing set 656. The testing set 656 may be randomly selected from the training data set 652, may be selected to be a representative sample of the training data set 652, and/or selected according to any suitable process. Although embodiments are discussed herein including both an OOT testing set 654 and a testing set 656, it will be appreciated that the OOT testing set 654 and/or the testing set 656 may be omitted and testing/validation may be performed using only the remaining testing set 654, 656.

At step 606, an iterative training and cross-validation process 658 is executed using the training subset 652a (or the training set 652 if a testing set 656 is not defined). The iterative training process and cross-validation is configured to generate one or more hidden layers that applies logistical regression to classify each set of input data in the training subset 652a into a selected set of categories. The categories available for classification are identified as part of the training data set 652. For example, in some embodiments, the training data set 652 includes sets of variables that are associated with either an identified fraudulent and/or non-fraudulent transaction, and the iterative training process is configured to classify each set of variables in one of the two defined categories. Although specific embodiments are discussed herein, it will be appreciated that any suitable categorical classifications may be identified in the training data set 352.

In some embodiments, the iterative training process is configured to minimize a cost function and/or determine one or more hyperparameters. The cost function may include a Sigmoid function having a value between 0 and 1. For example, in some embodiments, the cost function is defined as:

$-\log(h\theta(x))$ if $y=1$ $-\log(1-h\theta(x))$ if $y=0$

In some embodiments, the hyper-parameters may include, but are not limited to, a regularization parameter, level of emphasis on regularization, class weight, separation of training and test sets, number of folds in the cross validation process, number of training iterations, etc. The iterative training process generates a trained logit model 660.

At step 608, the trained logit model 380 is tested by classifying the testing set 656 previously defined from the training data set 652. If the first test at step 608 passes (e.g., if a predetermined number of variable sets within the training set 656 are correctly classified), a second test is performed at step 610. The second test includes classifying variable sets in the OOT Testing data 654 using the trained logit model 380. If both tests pass, the logit model 380 is output. In some embodiments, the output includes the trained logit model 380, logit coefficients 662, logit decision function(s) 664, and/or evaluation metrics 666 based on the first test and second test performed on the logit model 380.

With reference again to FIGS. 5-6, at optional step 314, additional testing of the trained logit model 380 may be performed. Although step 314 is discussed as a distinct step, it will be appreciated that testing of the trained logit model 380 may include testing previously discussed with respect to step 312 and/or may include additional testing. In some embodiments, testing may be performed by a logit model testing module 384. The logit model testing module 384 may be configured to generate one or more outputs, such as one or more evaluation metrics. Evaluation metrics generated during testing may include, but are not limited to, a training accuracy metric, a testing accuracy metric, a training precision metric, a testing precision metric, a training recall metric, a testing recall metric, receiver operating characteristic(s), confusion matrices, a precision-recall metric, a cumulative gain metric, a lift curve metric, averages of any of the foregoing metrics, and/or any other suitable metrics.

At step 316, the WOE transformations 364-364a and the logit model 380 are output. In some embodiments, the WOE transformations 364-364b may be integrated as a first step in the logit model 380 and the WOE transformations 364-364b are not separately output. The output may include, but is not limited to, a complete logit model 380, logit coefficients, logit decision function(s), WOE transformations 364-364b, and/or any other suitable output.

With reference again to FIG. 4, at step 208, the trained logit model 380 is deployed for data classification of variable sets during a process flow (e.g., classification of one or more interactions). When production data is received as part of the process flow identified at step 202, variables within the production data corresponding to the WOE feature set 370 used to generate the trained logit model 380 are transformed into WOE production variables using the WOE transformations 364-364b previously generated during the WOE-based method 300. The transformed WOE production variables are provided to the trained logit model 380, which classifies the current production interaction into one of the predetermined categories. For example, where the process flow relates to an e-commerce environment, the trained logit model 380 may be configured to classify the current transaction as a fraudulent or non-fraudulent transaction. The results of the classification may be stored for late review and/or may be provided to additional modules configured to perform one or more functions based on the classification.

Although the subject matter has been described in terms of exemplary embodiments, the claims should be construed broadly, to include other variants and embodiments, which may be made by those skilled in the art.

What is claimed is:
1. A system comprising:
a processor; and
a non-transitory computer-readable medium storing instructions that, when executed, cause the processor to:
receive a training data set including sets of variables and a classification of each set of variables, wherein the classification includes one of at least two potential classifications corresponding to anomaly detection;
generate a weight-of-evidence (WOE) feature set including WOE variables by:
for each set of variables:
generate one or more WOE transformations by applying a binning process to each variable of the each set of variables; and
generate a set of WOE variables for the WOE feature set by converting a corresponding variable of the set of variables using the one or more WOE transformations;
generate a trained logistic regression model by applying an iterative training process based on the WOE feature set, wherein the trained logistic regression model is configured to classify the each set of variables;
deploy the trained logistic regression model to a user interface to form an automated workflow;
classify in real-time, based on the automated workflow and via the user interface, a production data set into one of the at least two potential classifications using the WOE transformations and the trained logistic regression model;
in accordance with a determination that the production data set is classified into a first classification of the at least two potential classifications, execute subsequent operations of the automated workflow; and
in accordance with a determination that the production data set is classified into a second classification of the at least two potential classifications, terminate the subsequent operations of the automated workflow.

2. The system of claim 1, wherein the binning process comprises one of an isotonic regression or a binning tree process.

3. The system of claim 2, wherein the isotonic regression is applied to numerical variables in the sets of variables and the binning tree process is applied to categorical variables in the sets of variables.

4. The system of claim 2, wherein the isotonic regression includes a pool-adjacent-violators algorithm.

5. The system of claim 1, wherein applying the one or more WOE transformations generates a set of candidate WOE variables, and wherein generating the WOE feature set comprises selecting a set of N variables in candidate WOE variables based on information value of the candidate WOE variables.

6. The system of claim 5, wherein the set of N variables comprises a set of N variables in the candidate WOE variables having a highest information value within a predetermined range.

7. The system of claim 6, wherein the predetermined range includes an upper threshold value and a lower threshold value.

8. The system of claim 1, wherein applying the WOE transformations generates a set of candidate WOE variables, and wherein generating the WOE feature set comprises removing multi-collinear variables from the candidate WOE variables.

9. The system of claim 8, wherein the multi-collinear variables are identified based on a variance inflation factor.

10. A non-transitory computer readable medium having instructions stored thereon, wherein the instructions, when executed by a processor cause a device to perform operations comprising:
receiving a training data set including a sets of variables and a classification of each set of variables, wherein the classification includes one of at least two potential classifications corresponding to anomaly detection;
generating a weight-of-evidence (WOE) feature set including WOE variables by:
for each set of variables:
generating one or more WOE transformations by applying a binning process to each variable of the each set of variables; and
generating a set of WOE variables for the WOE feature set by converting a corresponding variable of the set of variables using the one or more WOE transformations;
generating a trained logistic regression model by applying an iterative training process based on the WOE feature set, wherein the trained logistic regression model is configured to classify the each set of variables;
deploying the trained logistic regression model to a user interface to form an automated workflow;
classifying in real-time, based on the automated workflow and via the user interface, a production data set into one of the at least two potential classifications using the WOE transformations and the trained logistic regression model;
in accordance with a determination that the production data set is classified into a first classification of the at least two potential classifications, execute subsequent operations of the automated workflow; and
in accordance with a determination that the production data set is classified into a second classification of the at least two potential classifications, terminate the subsequent operations of the automated workflow.

11. The non-transitory computer readable medium of claim 10, wherein the WOE feature set is generated by applying one of an isotonic regression or a binning tree process to at least one variable of the sets of variables.

12. The non-transitory computer readable medium of claim 11, wherein at least one WOE transformation includes the isotonic regression applied to a numerical variable of the sets of variables.

13. The non-transitory computer readable medium of claim 12, wherein the isotonic regression includes a pool-adjacent-violators algorithm.

14. The non-transitory computer readable medium of claim 11, wherein at least one WOE transformation includes the binning tree process applied to a categorical variable of the sets of variables.

15. The non-transitory computer readable medium of claim 10, wherein the training data set includes a set of N variables selected based on information value of a variable after applying at least one WOE transformation.

16. The non-transitory computer readable medium of claim 15, wherein the set of N variables comprises a set of N variables having a highest information value within a predetermined range.

17. The non-transitory computer readable medium of claim 16, wherein the predetermined range includes an upper threshold value and a lower threshold value.

18. The non-transitory computer readable medium of claim 10, the training data set includes non-multi-collinear variables.

19. A method, comprising:
receiving a training data set including sets of variables and a classification of each set of variables, wherein the classification includes one of at least two potential classifications corresponding to anomaly detection;

generating a weight-of-evidence (WOE) feature set including WOE variables by:
  for each set of variables:
    generating one or more WOE transformations by applying a binning process to each variable of the each set of variables; and
    generating a set of WOE variables for the WOE feature set by converting a corresponding variable of the set of variables using the one or more WOE transformations;
generating a trained logistic regression model by applying an iterative training process based on the WOE feature set, wherein the trained logistic regression model is configured to classify the each set of variables;
deploying the trained logistic regression model to a user interface to form an automated workflow;
classifying in real-time, based on the automated workflow and via the user interface, a production data set into one of the at least two potential classifications using the WOE transformations and the trained logistic regression model;
in accordance with a determination that the production data set is classified into a first classification of the at least two potential classifications, execute subsequent operations of the automated workflow; and
in accordance with a determination that the production data set is classified into a second classification of the at least two potential classifications, terminate the subsequent operations of the automated workflow.

20. The method of claim 19, wherein at least one WOE transformation includes an isotonic regression and a binning tree process, wherein the isotonic regression is applied to numerical variables and the binning tree process is applied to categorical variables.

\* \* \* \* \*